United States Patent [19]
Gray et al.

[11] Patent Number: 5,317,545
[45] Date of Patent: May 31, 1994

[54] TELEPHONE TIMER APPARATUS

[75] Inventors: Gary A. Gray, Thompson, Pa.; Brian LaRocca, Little Falls; Rodolfo Strauss, Union, both of N.J.

[73] Assignee: Strauss Trading Corp., Union, N.J.

[21] Appl. No.: 994,826

[22] Filed: Dec. 22, 1992

[51] Int. Cl.⁵ .................... G04F 8/00; G04C 3/00
[52] U.S. Cl. ............................ 368/4; 368/204; 379/114
[58] Field of Search ........ 368/4, 10, 64, 66, 107–117, 368/203–204; 379/111–114, 130, 131, 140

[56] References Cited

U.S. PATENT DOCUMENTS

| | | | |
|---|---|---|---|
| 3,767,862 | 10/1973 | Grushow | 179/7.1 R |
| 4,264,956 | 4/1981 | Delaney | 364/476 |
| 4,410,765 | 10/1983 | Hestad et al. | 179/7.1 R |
| 4,473,718 | 9/1984 | Ettel | 179/2 TC |
| 4,656,657 | 4/1987 | Hunsicker | 379/140 |
| 4,813,065 | 3/1989 | Segala | 379/112 |
| 4,935,956 | 6/1990 | Hellwarth et al. | 379/112 |
| 5,062,103 | 10/1991 | Davidson et al. | 570/58.1 |

Primary Examiner—Vit W. Miska

[57] ABSTRACT

Telephone use control apparatus in which a microcontroller controls the functions of the apparatus and in which the apparatus is provided with batteries to maintain power to the microcontroller and circuitry associated therewith when the the telephone is in operation, and means for providing power from the incoming telephone line to run the apparatus when the telephone is not in use. The incoming power from the telephone line is also usable to recharge the batteries. In addition, the case for the apparatus is made to mount the electrical components without the use of screws, and to permit the assembly of the various parts of the case, also without screws.

2 Claims, 15 Drawing Sheets

TELEPHONE TIMER APPARATUS

BACKGROUND OF THE INVENTION

This invention relates to electronically operated telephone use control apparatus that can be added to an existing telephone.

Existing add-on telephone timing devices generally use a simple clock device to measure the duration of a telephone call. The clock device is normally off, and is turned on and off when and if the user remembers to do so.

Mechanical switches, such as that described in U.S. Pat. No. 4,473,718, are employed to time calls. These mechanical switches are switched from one state to another when the telephone handset is lifted out of, or replaced in, its cradle.

The prior art add-on timing devices are not part of the telephone, do not take their signals or cues from the telephone line, and depend on mechanical rather than electrical activation. They required batteries to deliver the power required to operate the device. Either expensive and cumbersome battery rechargers were required, along with expensive batteries, or the most expensive batteries were employed. In the latter case, battery life was relative short, and in the former case, a precious separate electrical outlet was taken for use by the timing device. The timing device was also subject to line voltage spikes and to damage in the absence of protective means in the recharging circuit or the device itself, another expensive element.

OBJECTS OF THE INVENTION

It is an object of the invention to provide an electronically operated telephone add-timer apparatus that is connected to a telephone and to the telephone's incoming telephone line.

It is a still further object of the invention to provide an electronically operated add-on telephone timer apparatus that employs batteries to operate the electronic telephone use control apparatus when the telephone is in use, and the electrical power available through the telephone line to charge the batteries when the telephone is not in use.

It is a still further object of the invention to provide an electronically operated add-on telephone timer apparatus that employs batteries to operate the electronic telephone timer apparatus when the telephone is in use, to shut down the power drain from the batteries when the telephone is not in use to preserve the batteries, and to employ the electrical power available through the telephone line to charge the batteries when the telephone is not in use.

It is a further object of the invention to provide an electronically operated add-on telephone timer apparatus that employs a microcontroller to control the functions of the apparatus.

It is a further object of the invention to provide an electronically operated add-on telephone timer apparatus that electronically senses whether the telephone is in use or not, begins timing when the telephone is in use, and ends timing when the user disconnects the line, including means for displaying the time taken by the call on a liquid crystal display.

It is a further object of the invention to provide an electronically operated add-on telephone timer apparatus that electronically senses whether the telephone is in use or not, automatically disconnects the timing function for incoming calls, begins timing when the telephone is in use for outgoing calls, and ends timing when the users hangs up, including means for displaying the time taken by the call on a liquid crystal display.

It is a still further object of the invention to provide an electronically operated add-on telephone timer apparatus that allows the user to set selected parameters that affect the operation of the said apparatus.

It is a still further object of the invention to provide an electronically operated add-on telephone timer apparatus that allows the user to set selected parameters that affect the operation of the said apparatus, and in particular to set an alarm to advise the user of elapsed time.

It is a still further object of the invention to provide an electronically operated add-on telephone timer apparatus that requires the entry of a security code before the user can change selected settable functions within the timer apparatus of the instant invention.

It is another object of the invention to house the add-on telephone apparatus in a case having a liquid crystal display for displaying elapsed usage time.

It is a still further object of the invention to make the case of a plurality of components in which the individual components are provided with connecting means for connecting the component to its cooperating component without the use of external fasteners, thus permitting the case to be easily and inexpensively assembled.

BRIEF DESCRIPTION OF THE DRAWINGS

FIG. 20 illustrates timing of the voltages on various lines in FIG. 17;

FIGS. 21 to 27 are flow charts illustrating the details of steps in FIGS. 18 and 19.

DESCRIPTION OF THE PREFERRED EMBODIMENTS

Figure 1:
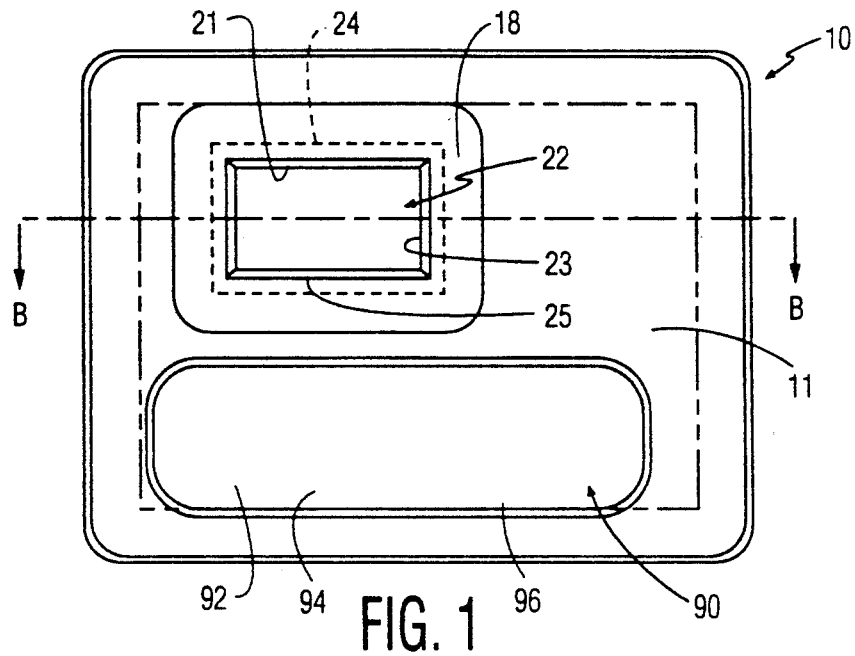
FIG. 1 is a top view of the case of the instant invention.
Figure 2:
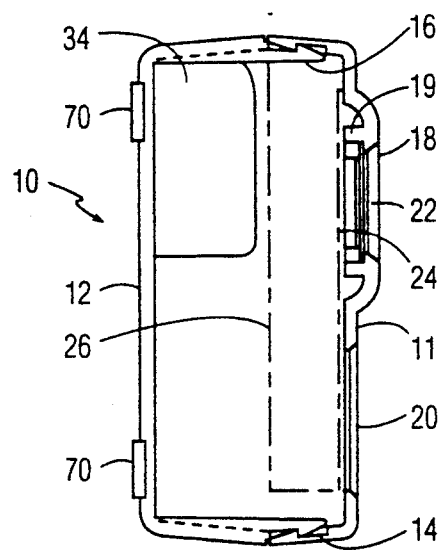
FIG. 2 is a side cut away view of the case of FIG. 1.

Referring now to FIG. 1, a case 10 is provided in which the various elements of the telephone timing apparatus are mounted. As shown in FIG. 2, the case has a top housing 11 and a bottom housing 12. The top housing 11 is provided with a plurality of undercuts 14 along its inner edge, and bottom housing 12 is provided with a plurality of engaging hooks 16 adapted to cooperate with and engage the undercuts 14. When the top and bottom housings are pressed together, the engaging hooks 16 are pressed inwardly, clearing the edge of the undercut, the hooks 16 snap into place in the undercuts, thus providing a firm connection between the top and bottom housings.

Figure 3:
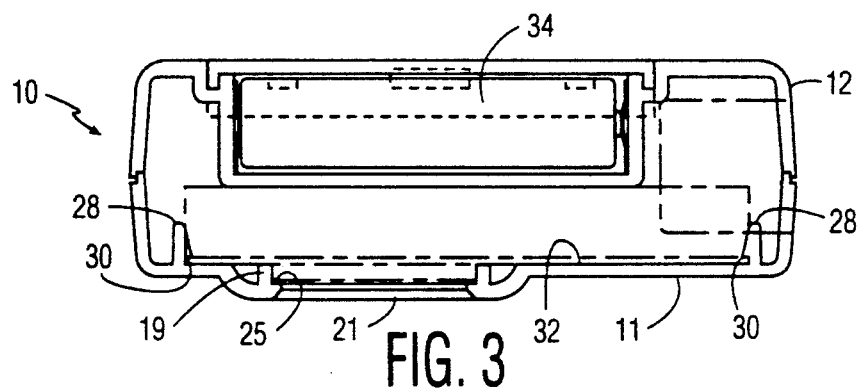
FIG. 3 is another side cut away view of the case of FIG. 1 showing the battery component.
Figure 4:
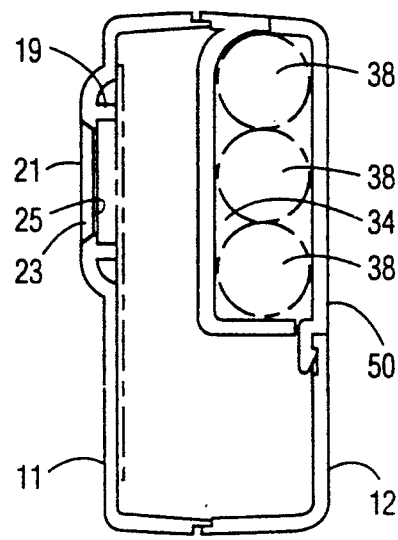
FIG. 4 is still another side cutaway view of the case of FIG. 1 showing the battery compartment from the point at which the batteries are inserted.

As shown in FIGS. 2, 3 and 4, the top housing is provided with a chamber 18 that rises above the upper surface 20 of the top housing 11. The chamber is provided with a spacer 19 shown as a rectangle that rims the entire chamber, for purposes that will be described further hereinbelow. The chamber is provided with an opening or window 21 bounded by a edge 23 that is provided with an undercut shelf 25 that surrounds the opening or window 21. A conventional planar LED assembly, denoted by the numeral 22, is made dimensionally larger than the window 21 so that it will fit against the shelf 25. A conventional zebra contact strip 24 that electrically connects the LCD output/input leads (not shown) to a circuit that supplies power to operate the LCD display, which will be described in detail below, is mounted against the planar LCD assembly. The zebra strip has dimensions approximately the same as those of the planar LCD assembly. If desired, the spacer 19 may comprise a plurality of pins instead of a rectangle.

A printed circuit board 26 is mounted in top housing 11. Top housing 11 is provided with a plurality of mounting flanges 28, each of which is provided with an undercut 30 adapted to receive the edge of the printed circuit board 26. The printed circuit board is press fit between the flanges 28 such that the edges of the printed circuit board are engaged by the undercuts 30. The undercuts 30 are positioned adjacent the inner surface 32 of the top housing 11. When the printed circuit board is pressed in so that its edges engage the undercuts 30, the printed circuit board is pressed against the zebra strip, thus insuring good contact between the leads on the printed circuit board and the zebra strip 24.

Figure 7:
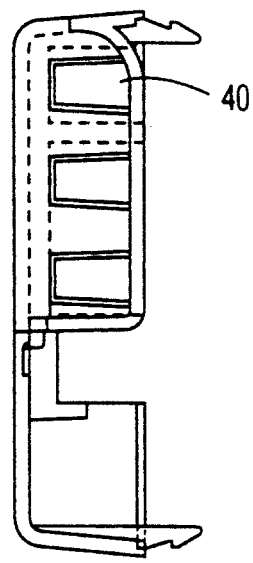
FIG. 7 is a side view of the bottom housing of the case taken along line A—A in FIG. 6.
Figure 9:
FIG. 9 is a plan view of one of the battery contacts employed in the present invention.
Figure 10:
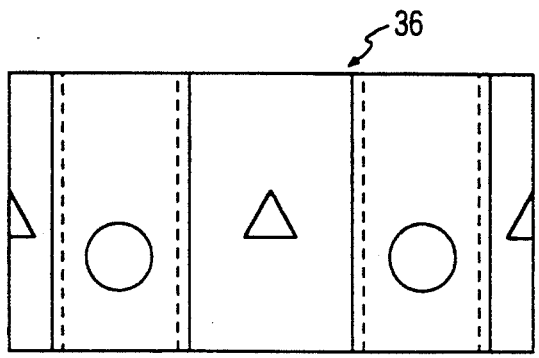
FIG. 10 is a side view of the battery contact of FIG. 9.
Figures 11, 12:
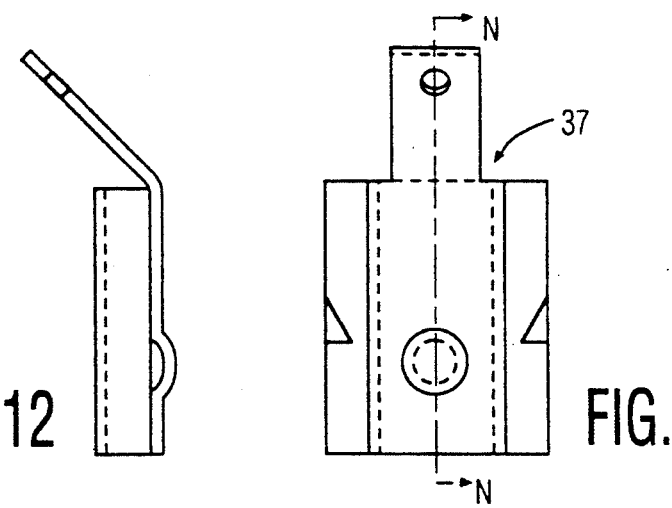
FIG. 11 is a plan view of still another battery contact employed in connection with the present invention.
FIG. 12 is a side view of the battery contact of FIG. 1 taken along line N—N in FIG. 11.

Referring to FIGS. 2, 3 and 4, the case 10 is provided with a battery chamber 34 contained within the confines of the bottom housing 12. The battery chamber 34 is provided with molded channels 40, as best seen in FIG. 7, equal in number to the number of batteries to be used. In the embodiment shown, three channels for three batteries are employed. The batteries are denoted by the numeral 38. The batteries are connected to each other via a plurality of battery contacts 36, as shown in FIGS. 9 and 10, and a plurality of battery contacts 37, as shown in FIGS. 11 and 12. The battery contacts 36 and 37 are press mounted at opposed ends of channels 40 and provide contact between the batteries, in series with each other, to provide the operational voltage required to power the circuit contained on the printed circuit board, described hereinbelow. Conventional soldered wire leads (not shown) are provided to connect the battery contacts with the printed circuit board.

Figure 8:
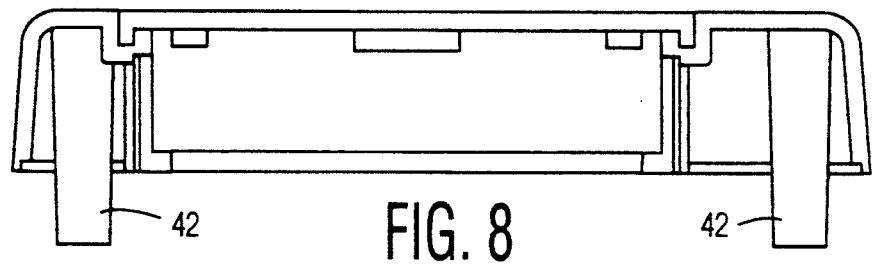
FIG. 8 is another side view of the bottom housing taken along line F—F in FIG. 6.

As best seen in FIG. 8, a plurality of molded bosses 42 are provided in the bottom housing 12. Molded bosses 42 are adapted to contact the printed circuit board after the bottom housing is assembled to the top housing, thus applying additional force to press the printed circuit board against the zebra strip. The additional force exerted by the bosses 42 tends to insure good electrical contact between the printed circuit board and the zebra strip, especially when the case 10 is subject to abuse.

Figure 13:
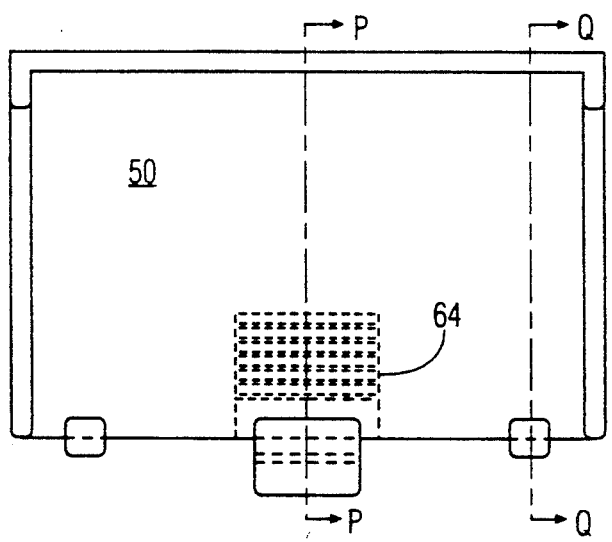
FIG. 13 is a plan view of the removable door assembly for covering the battery cavity.

The battery compartment 34 is provided with a door 50. The construction of the battery door 50 is best seen in FIGS. 4 and 13. A finger operated striated section 64 is provided so that the door 50 can be moved to its open and to its closed position using finger pressure only.

Figures 14, 15, 16:
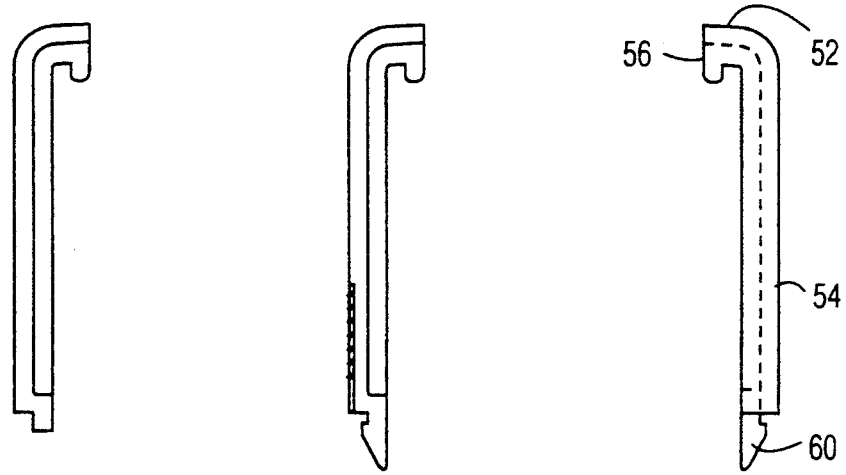
FIG. 14 is a side view of the battery cover of FIG. 13.
FIG. 15 is a view of the battery cover taken along line P—P in FIG. 13.
FIG. 16 is a view of the battery cover taken along line Q—Q of FIG. 13.

As shown in FIG. 14, the door 50 is substantially L-shaped and is provided with a short leg 52 and a long leg 54. The short leg 52 terminates in a U-shaped hook 56 adapted to engage a pair of cooperating ridges 58 (not shown) on the bottom housing 12. The hook 56 and cooperating ridges 58 lock together to lose the door and cover the battery compartment when the U-shaped hook is in contact with the cooperating ridges 58, and to disengage to permit the door 50 to be opened using finger pressure alone to replace the batteries. The long leg 54 terminates in a raised ridge connector 60 that is adapted to engage a cooperating undercut 62 located on the bottom housing 12. The cover 50 is mounted in place by placing U-shaped hook 56 over cooperating ridges 58, and using finger pressure on the striated portion 64 of the battery cover to push inwardly and down, thus sliding the connector 60 under cooperating undercut 62.

To release the door 50 to effect a change of batteries, the procedure is reversed. Finger pressure is applied to the striated section 64, pushing the striated section and the connector inwardly to free the connector from its cooperating undercut 62. As this occurs, finger pressure is employed to push the battery door upwards towards the upper housing 11, thus causing the U-shaped section 56 to release its connection to cooperating ridges 58. The cover is then easily removed, the batteries replaced, and the cover reinstalled in the manner set forth hereinabove.

The case 10 is assembled without screws. The components of the case described herein snap together, thus easing assembly and disassembly for repair purposes. Fewer assembly steps are required, thus reducing labor time and costs in assembling the case. Service is also made easier as no tools are required.

The case is provided with a plurality of feet 70 (see FIG. 2) mounted by conventional glue to the bottom housing 12, thus providing a stable surface on which the case rests. The feet 70 are preferably made of a soft material, such as felt, to reduce marring the surface on which the case is placed by the end user. Of course, if desired, the feet 70 may be dispensed with.

Figure 5:
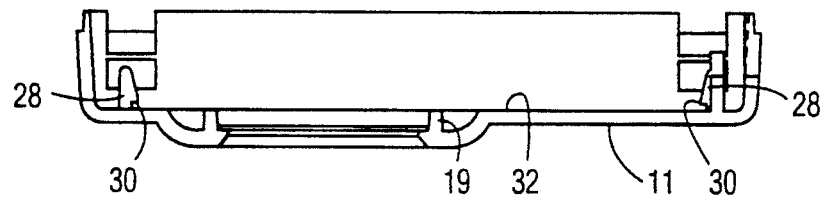
FIG. 5 is a detail view of the top housing of the case taken along line B—B in FIG. 1.
Figure 6:
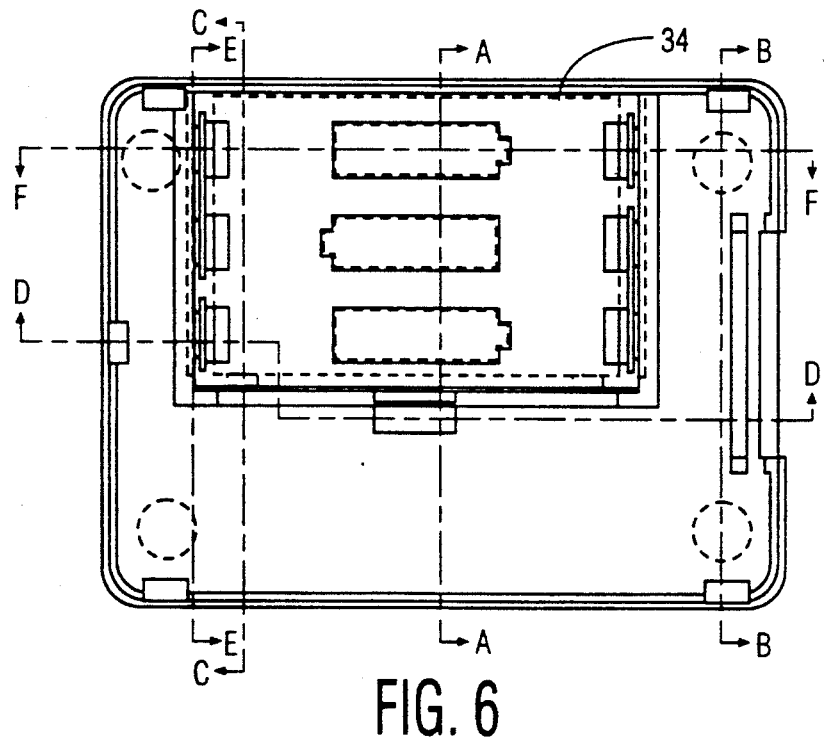
FIG. 6 is a plan view of the bottom housing of the case.

The printed circuit board 26 electrically communicates with a pair of telephone jacks generally indicated by numeral 98 mounted on the case and shown in general outline in FIG. 5. The case is placed between the telephone line cord (not shown) and the telephone handset (also not shown). The line cord is connected to one of the jacks to feed line signals and power from the line cord to the printed circuit board 26, and the other jack connects the printed circuit board and the telephone handset (not shown). These jack and line connections are conventional and for simplicity are not further described herein.

Referring to FIG. 1, a keypad 90 is shown mounted on the top housing 11. The keypad 90 is provided with three keys 92, 94 and 96, although more or fewer keys can be used if desired. The keys cooperate with switch contacts (not shown) that lie below the keys and are mounted on, and are a part of, the printed circuit board 26. The three keys of the keypad, shown in FIG. 1, are labeled up, down and set. The up and down keys allow for the adjustment of the selected parameter, as discussed more fully below. Pressing the keys, as will be described in further detail hereinbelow, is employed to change selected operational parameters of the system.

Figure 17:
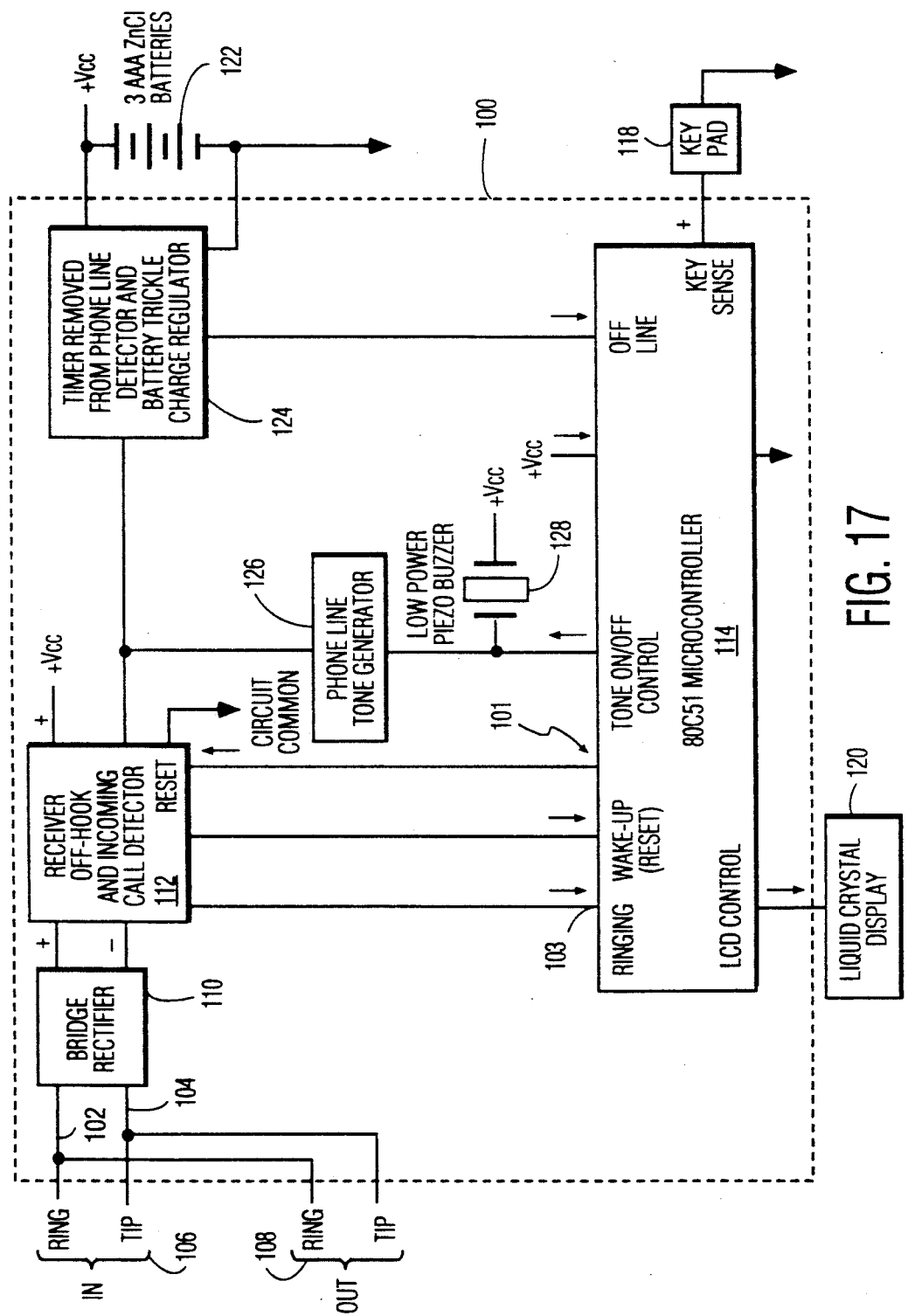
FIG. 17 is a circuit diagram of the telephone timer of the instant invention.

Referring now to FIG. 17, the dotted line denoted by the numeral 100 encloses the electronic components that form the printed circuit board 26. As shown in FIG. 17, the telephone input line, denoted by the numeral 102, and the telephone tip line, denoted by the numeral 104 are connected to in and out connectors 106 and 108 respectively. The telephone line denoted as "in" connects the printed circuit board with the main telephone line, while the line denoted as "out" connects the printed circuit board with the telephone handsets (not shown).

Lines 102 and 104 are connected to a bridge rectifier 110 that protects the circuitry of the printed circuit board and prevents damage to the circuitry in the event the "ring" and "tip" wires 102 and 104 are reversed. The bridge rectifier 110 is connected to a detector 112 for detecting whether the telephone receiver is off the hook and generating a tone, or an incoming call is present. If either condition is present, the detector 112 signals microcontroller 114. For best results, microcontroller 114 is an 80C51 class microcontroller, preferably 114 is an 80C51 class microcontroller, preferably an 87C51 microcontroller. As shown, the microcontroller interfaces with the key pad 118 and the liquid crystal display, herein denoted by the numeral 120, without the need for separate controllers. The microcontroller is programmed in the manner set forth in FIGS. 18 through 28, which will be described in detail hereinbelow.

The microcontroller 114 draws little power when the telephone to which it is connected is not in use, or in its "powered down" state. In this condition, the microcontroller draws less than 5 μa, which is below the level of power supplied directly by the telephone company through its lines. Thus, the microcontroller is always "warm" and ready to respond to an incoming or outgoing signal. The small level of current is also employed to charge the batteries 122 through the battery trickle charge regulator 124 that operates when the telephone to which the timer is connected is not in use. For best results, simple and inexpensive batteries are employed, preferably Zinc Chloride, that are easily charged using the trickle current available from the telephone company.

When an incoming call or outgoing is received or made, the timer "powers on", thus drawing power from the batteries. The current draw of the timer is below about 4 ma, thus permitting the batteries to operate the timer circuit over long periods of time before recharging of the batteries is required.

The detector 112 is also connected to both a phone line tone generator 116 and to a timer, located within the microcontroller 114, and to a battery charge trickle regulator 118. The batteries 122 supply power to operate the timer when an incoming or outgoing call is sensed, as will be described hereinafter. In the absence of an incoming or outgoing signal, power to keep the microcontroller "warm" in its powered down condition is supplied by telephone line power, the batteries 122 do not supply power to the timer, and the trickle charge regulator shunts a portion of the telephone line current to recharge the batteries 122. The batteries tend to last a long time, are of the type that can take a continuous low power charge, even if the batteries have been only slightly discharged through use. From the standpoint of the user, the timer can be operated at the smallest possible power cost since it is only drawing power from the batteries during actual operation and not during its stand-by mode.

The microcontroller is connected to key pad 119 which is employed to set selected parameters for use by the microcontroller 114. These parameters are (1) security code to prevent the unauthorized change of the pre-set parameters of the timer apparatus (2) the ability to enable piezo-electric buzzer 128 (3) the ability to set the dial out delay time (to be described further hereinbelow) (4) the ability to set an alarm to remind the user when a preselected amount of telephone time has elapsed. Other and further parameters can be programmed, if desired, by changing the program control codes at the microcontroller level as would be well known to any person of ordinary skill in the art. The parameters can be set using the key pad 119, which is preferably a three key pad denoted by numeral 90 in FIG. 1. The select key, when pressed, cycles the microcontroller through the four parameters listed immediately above. The selected parameter is displayed by the liquid crystal display, and the parameter is then cycled through its various states using the up and down keys.

The key pad circuitry comprises the three keys that act as switches, and three resistors of 1 MΩ each (not shown) connected in series with the keys and to the microcontroller 114.

The detector 112 is connected to a phone line tone generator 116 which is in turn connected to a low power sensor 128 and to the microcontroller 114. When a signal is received from the timer and trickle regulator 118 after a preselected time has elapsed, as set through the key pad 119, the tone generator 116 will generate a tone on the telephone line. The generated tone informs the telephone user that the programmed time has elapsed, thus helping that user keep track of time spent on expensive telephone calls. The buzzer 128 emits an audio signal so that others in the surrounding area will also know that the call has exceeded is programmed length, again tending to cut down on caller abuse of the telephone. The duration of the tone that is generated, and its frequency, are under the control of the microcontroller 114, as will become apparent hereinafter.

The phone line tone generator comprises a 10 kΩ resistor connected to a conventional transistor acting as a switch, and to a piezo electric buzzer that is a part of the phone line tone generator circuit 116.

The receiver off hook and incoming call detector 112 detects when the rectified voltage across the bridge rectifier 110 drops below 12 volts. When this occurs, the detector 112 issues a momentary pulse to the microcontroller 114. The pulse resets the microcontroller 114 from its low or power down mode to its high or power mode in which the batteries 122 are supplying full power to the microcontroller 114 and the associated timer circuitry.

Detector 112 is triggered by one or more of the following events:

(a) when the telephone begins to ring, indicating an incoming call; or (b) when the telephone is removed from the cradle; or (c) when a power drop has occurred across the telephone company's phone lines; or (d) when the timer itself (denoted by the numeral 100) is removed from the telephone line.

For best results, the microcontroller 114 is provided with the ability to distinguish between the four triggering events listed in (a) through (d) above. The microcontroller is also provided with means for determining when a call is terminated, thus allowing the timer to "power down". The microcontroller is programmed to interpret these signals in accordance with the following truth table:

| RINGING | OFF LINE | EVENT |
| --- | --- | --- |
| High | High | Call Out in Progress |
| 60 Hz Toggle | High | Phone Ringing |
| Low | High | Call Terminated |
| High | Low | Timer Removed from Line or Power Outage |

Circuit 118 contains means for determining if the timer has been removed from the telephone line. A resistor (not shown) and a pair of diodes (also not shown) are employed for this purpose. The diode pair block the path of battery sneak currents which would otherwise occurs. This allows the signal labelled "off line" in the foregoing truth table to be pulled low by the resistor when the timer is removed from the telephone line.

The circuit components employed for the Off Hook and Incoming Call detector are three 10 kΩ resistors in a first resistor network (not shown), three capacitors of 0.1 μF each (not shown), a 12.1 Volt Zener diode (not shown), a second resistor network comprised of three resistors of 1 MΩ each, a conventional transistor and a conventional ½ flip flop. The manner in which these components are interconnected to achieve the intended result set forth above is well known to those of ordinary skill in the art.

The battery and trickle charge regulator is part of the circuit denoted by the numeral 118. For best results, the batteries employed are three AAA size batteries 122. The three AAA batteries provide 600 mA-hours at 4.5 volts. The regulator prolongs battery life greatly by slowly charging the batteries using power from the telephone line to which the timer of the instant invention is connected when the telephone is not in use. The Zinc Chloride batteries are particularly suitable for use in connection with the instant invention as they are generally not deeply discharged when the timer of the instant invention is in operation, and the accept charge when only mildly discharged.

When the telephone is not in use, the regulator section of circuit element 118 draws about 230 μA from the telephone company line, and the section of the circuit that is the timer circuitry typically draws less than 25 μA. The excess current, or approximately 205 μA are supplied to the batteries for recharging if the aggregate voltage drop across the batteries falls below 4.5 volts.

When the telephone is in use, the timer of the instant invention draws all of its power from the batteries 122. The current draw us generally less than 4 mA, or approximately 20 times as much as the 205 μA made available for recharging by the trickle charge circuitry. Accordingly, if the telephone is in use in average 1/20 of the idle time, the batteries will not generally experience deep discharge. This relationship, in use, will permit the recharging of the batteries many times, thus prolonging the life of the batteries and the overall usefulness of the timer of the instant invention.

The trickle charge regulator circuitry is shown in FIG. 30 and comprises a 30 kΩ resistor 113, a silicon diode 115, a 5.1 volt Zener diode 119, and the batteries 122.

Figure 18:
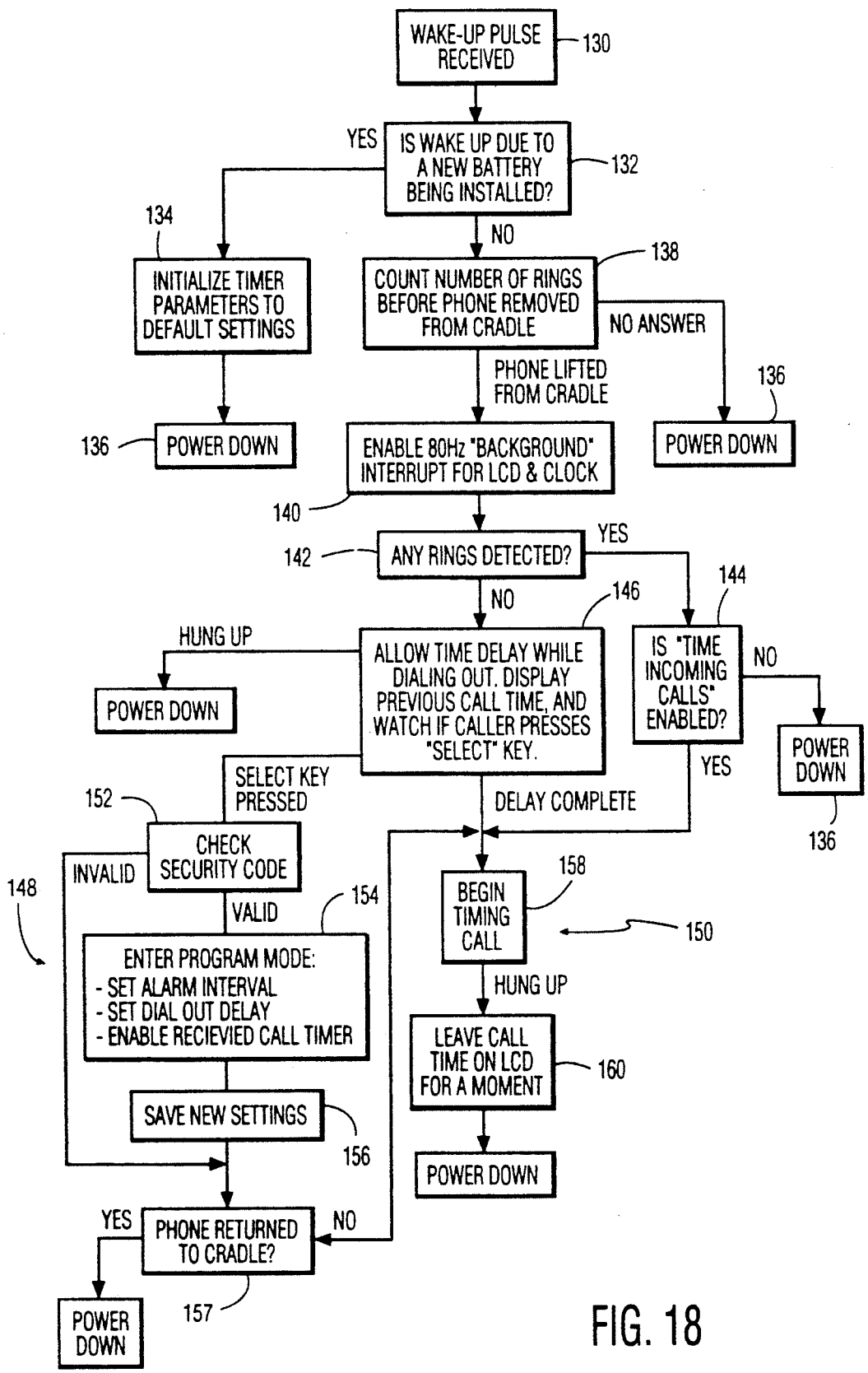
FIGS. 18-27 and 19 are program flow charts demonstrating the manner in which telephone calls are timed by the circuit of the instant invention.

FIG. 18 represents the main program flow control chart for the microcontroller 114. After the batteries 122 are installed in the timer of the instant invention, the timer is in its "power down" state during which substantially no current is drawn from the batteries 122.

The timer of the instant invention is "powered up" when it receives a "wake-up" pulse or signal, denoted by the numeral 130 in FIG. 18. The wake up call activates the microcontroller 114, as shown in 101 in FIG. 17. As indicated earlier, the wake up pulse or signal can be due to several factors, described in greater detail earlier in the body of this specification.

The wake up pulse or signal is tested in accordance with the truth table described hereinabove and as indicated at 132 in FIG 18. If the signal is due to a new battery having been installed in the timer of the instant invention, the timer default settings are initialized, as indicated at 134, and then the timer of the instant invention powers down and enters its rest mode as indicated at 136, awaiting the next wake up call. If the wake up pulse or signal arises for reasons other than the installation of a new battery, the number of telephone rings are detected by the microcontroller 114 as shown at 103 in FIG. 17. Means for counting the number of rings is provided as indicated at 138 in FIG. 18 and, if a selected number of rings occurs without telephone activation, such as by the user lifting the handset, the timer of the instant invention enters its "power down" mode, awaiting the next activation.

Activation of the telephone can occur either as a result of a incoming call or when an outgoing call is placed. In either case, the telephone is activated by the user, either by lifting the handset from its cradle or by an equivalent action, such as turning on the speaker of a speaker phone that connects the telephone speaker, or its handset, to the telephone line. When either event occurs, a clock indicated at 140 running at 80 Hz is enabled, which then supplies the signals required to run the "clock" that times the event, showing the elapsed time on the face of the liquid crystal display.

The program distinguishes between an outgoing and an incoming call by detecting the presence of ringing tones, which indicate that a call is incoming, as indicated at 142. If the call is an incoming call, and assuming that the user has no wish to time incoming calls and has used the keypad 118 (see FIG. 17) to set the incoming call timing parameter to "off", as indicated at 144, then the timer of the instant invention powers down and awaits the next activation. If no rings are detected at step 142, the microcontroller reads this state as one in which an outgoing call is being made. One of three modes are selectable at this point in program operation, as indicated at step 146. First, a time delay is engaged while the user is on the line in connection with the outgoing call. The microcontroller 114 sends a signal to the liquid crystal display that displays the last call time, although this step can be dispensed with if desired, and the controller scans the keypad to determine whether the functions controlled by the keypad have been activated by the user pressing the "select" key on the keypad. If the user does not engage the number dialed and hangs up during the delay periods, the timer of the instant invention powers down and awaits its next activation. However, if the either the keypad select is pressed, or the line is answered, the program will select one of two branches 148 or 150 for further program execution.

If the user presses the "select" key on the keypad, the program branches to branch 148. A security code must be entered at step 152, which, if valid, will allow program execution to proceed. If the entered security code is invalid, the timer of the instant invention will enter its power down mode, and the user will have to repeat the process until the correct security code is entered. If the entered security code is valid, the microcontroller enters program mode in which the parameters that are settable using the keypad can be set or changed by the user, shown as step 154. If new settings are entered, these are saved as shown at step 156. Program flow continues to step 157 where the microcontroller determines whether the telephone has been disconnected, as would be the case if the user chose to change the keypad selectable parameters without making an outgoing telephone call. The user selectable parameters that can be changed or set using the keypad are indicated at step 154 in FIG. 18 and described earlier in the body of this specification.

If the telephone is immediately thereafter returned to its cradle. The microcontroller will power down, as indicated in FIG. 18. If the telephone is not returned to its cradle, and an outgoing call is being made, the program will direct program flow to branch 150. It is important to note that for an incoming call, where the timer of the instant invention is enabled, step 144 will direct program flow to branch 150. As indicated in FIG. 18, branch 150 will begin to time the call, whether it is outgoing or incoming (provided, of course, that incoming calls are timed), shown as step 158 in FIG. 18. The amount of time the call took remains on the liquid crystal display for a selected period of time so that the user can note the time taken, which is shown as step 160 in FIG. 18, after which the timer of the instant invention powers down and awaits the next activation.

Figure 19:
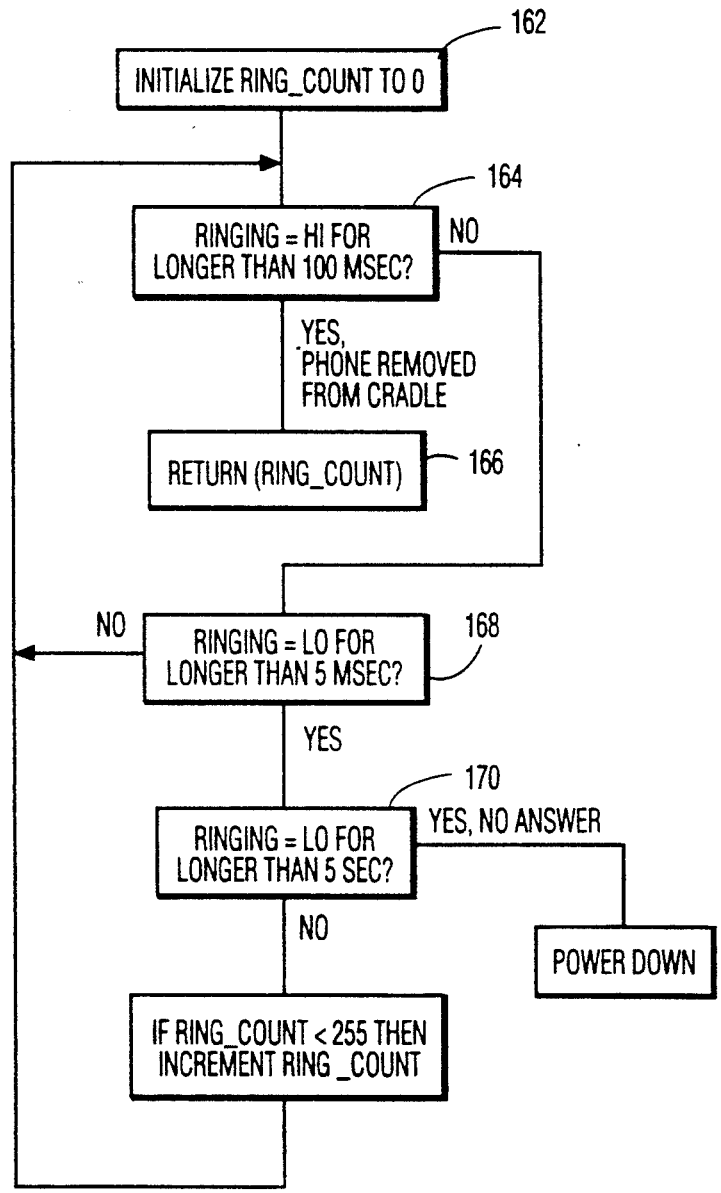
Figure 21:
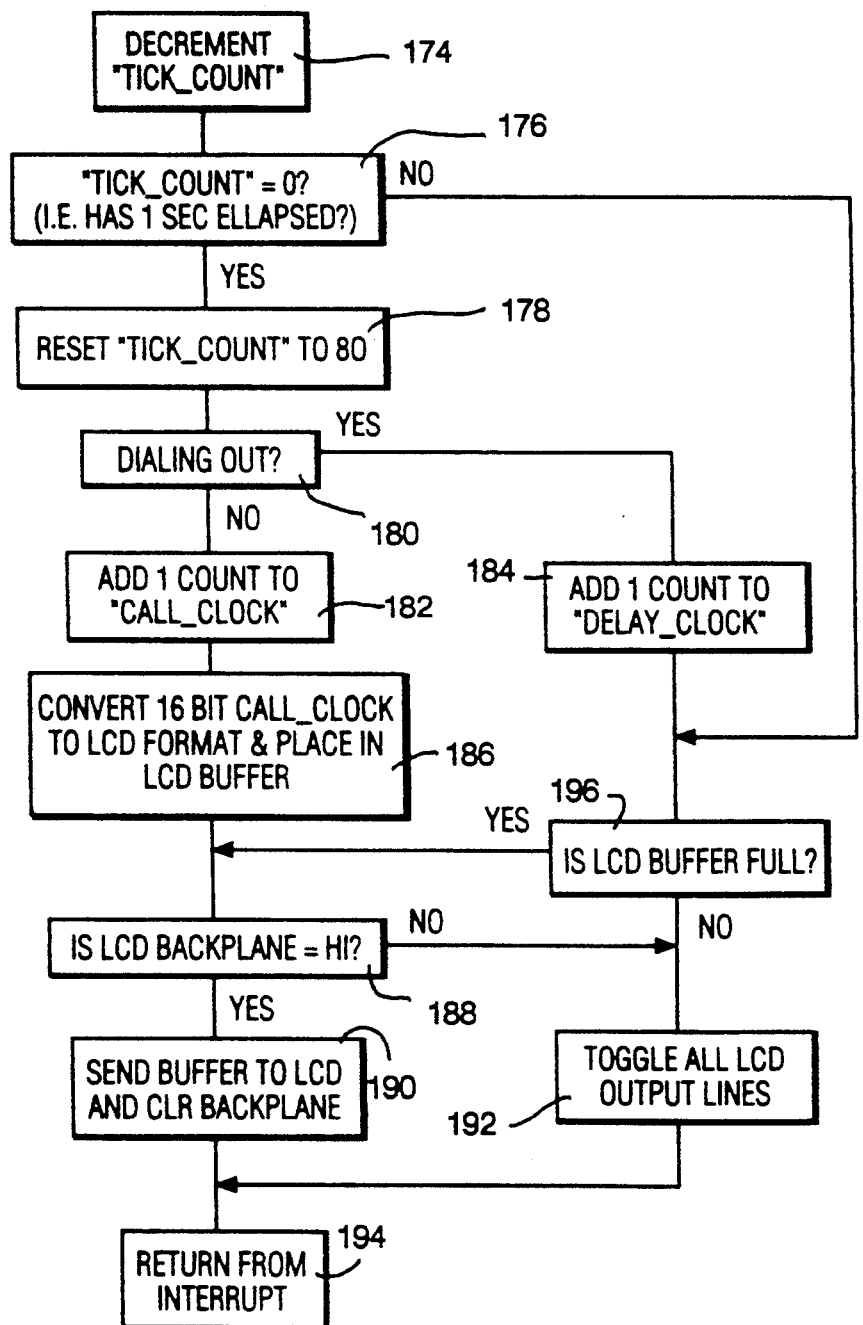
Figure 22:
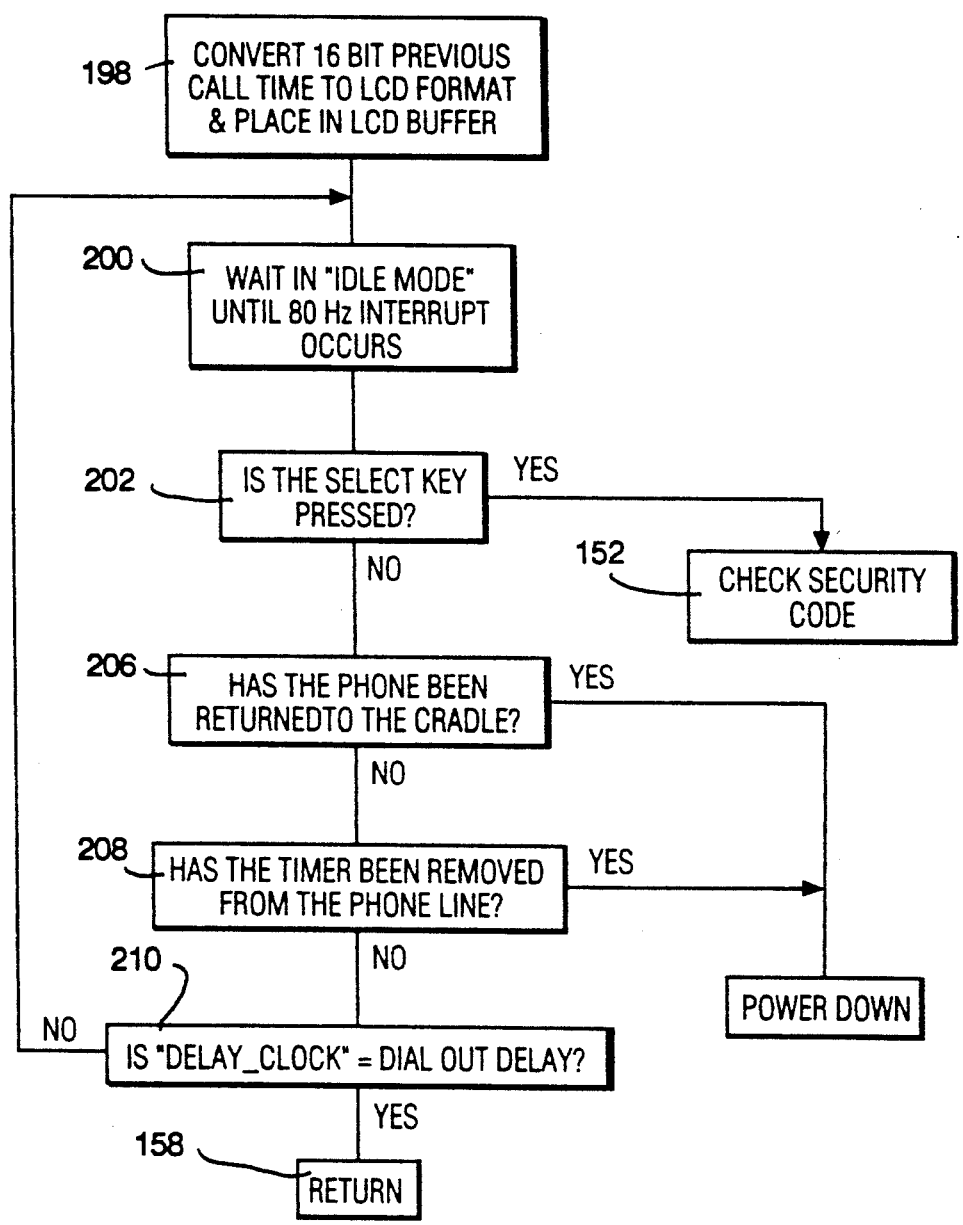

Program step 138 comprises a plurality of steps as demonstrated in FIGS. 21 and 22. When the wake up pulse 130 (see FIG. 18) is received at step 138, thus activating the ring counting steps of the program. As depicted in FIG. 19, when the microcontroller senses ring from the telephone line, the program initializes the ring count to zero, which is depicted as step 162. If the Receiver Off Hook and Incoming Call Detector 112 (see FIG. 17) detects ringing, the truth table establishes provides a high level to the microcontroller. At step 164, the program monitors the time period during which ringing occurs, and if it is longer than 100 milliseconds and the user removes the telephone from its cradle, the ring count is returned, as indicated at step 166, and program control passes to step 140 in FIG. 18. If the foregoing conditions are not met, program control passes to step 168 in FIG. 19 which detects whether the ringing level is low and stays at that level for more than 5 milliseconds. If this condition is met, program control passes to step 170 which monitors the telephone line for an additional five seconds. If ringing is still low at that time, the truth table is invoked and the microcontroller determines that the call has been terminated, or that a no answer condition exists if the call is an outgoing call, and the microcontroller enters its powered down state.

If the 5 second condition is not met, program control passes to step 172 and the program ring count is measured. If the ring count is less than 255, the program loops to the beginning, as shown in FIG. 19.

Returning to program step 164, if the ring is not at the high level for more than 100 milliseconds, program control bypasses step 166 at that point and instead program control if passed to step 168. If the ring is not at the low level for more than 5 seconds, the program loops back to the beginning, as shown in FIG. 19.

Figure 20:
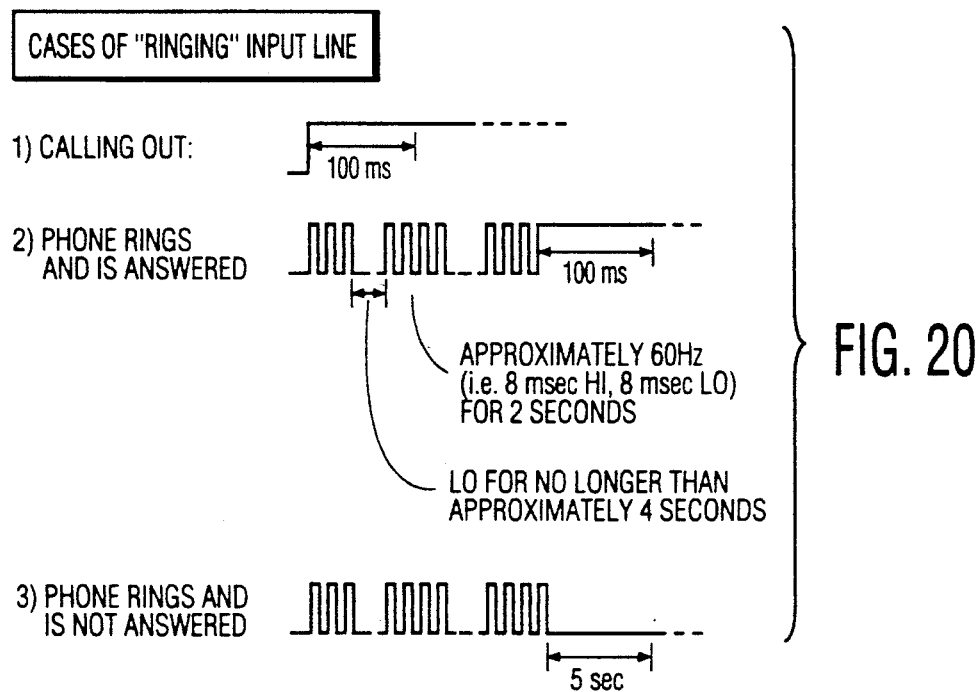

The signal by which high and low values are determined for the truth table and for the purposes of the ring counting section of the program control code is shown in FIG. 20. It is to be understood that the term "ring" or "ringing" as used herein means a state in which the telephone is connected to the telephone company line, and the batteries 122 of the timer of the instant invention have been activated. As shown in FIG. 20, when an outgoing call is made, a high voltage is expressed on the ringing input line 103 to the microcontroller 114 as shown in FIG. 17. If an outgoing call is made, the "ring" level remains high as shown in part (1) of FIG. 20, and is detected as such by the microcontroller 114. If an incoming call is detected, each actual ring impresses a high voltage on the "ringing" line 103, followed by a low voltage that represents the period in between actual rings, as shown in part (2) of FIG. 20. This condition is represented by the 60 Hz toggle included in the truth table and represented in FIG. 20 (2). Typical ring length is about 2 seconds, while the time between rings is generally less than 4 seconds at which the impressed voltage level remains low. If the telephone is answered by the user or by the called party picking up the cradle, the telephone line is then directly connected, the batteries 122 are connected, and voltage then rises to its high state or level for as long as the telephone is in use. Finally, FIG. 20 (3), if the line rings low for more than 5 seconds, it is read as a no answer, and the microcontroller 114 powers down.

The program step denotes by the numeral 140 in FIG. 18 comprises a plurality of steps shown in FIG. 21. The 80 Hz background interrupt occurs at the rate of 80 times per second, thus providing a 40 Hz square wave signal to drive the liquid crystal display and to update clock times that are displayed by the liquid crystal display. The interrupt functions in the background during normal program operation.

When the telephone is lifted from its cradle for an incoming or outgoing call, a signal is passed by the program to the interrupt 140, as shown in FIG. 18. When this program is received, it is sensed by the microcontroller at step 174 (see FIG. 21). The program then passes control to step 176, at which the number of pulses issued by the interrupt is counted. In other words, if the telephone handset remains off its cradle for one second or more, the one second delay will be sensed by 80 pulses (corresponding the 80 Hz interrupt signal) having been received. If the telephone is off the cradle for one second or more, control passes to step 178, at which the counter is reset to 80, awaiting the next receiver "off-hook" condition.

When step 178 is completed, control passes to step 180, at which the type of line signal is sensed. At this point in system operation, only one of two conditions can exist with the handset off the cradle. Either an outgoing call is in progress, or an incoming call is in progress. For operational purposes, a condition in which the handset is "off-hook" and in which no outgoing or incoming call exists will be read by the system as an outgoing call in accordance with the truth table set forth hereinabove. At step 180, the microcontroller senses whether or not the signal is high. If the signal is not high, indicating that the call is an incoming call, program control passes to step 182. If the signal is high, indicating an outgoing call, program control branches to step 184 instead.

Assuming that the "off-hook" condition is caused by an incoming call, this information is stored by the program for use by a subroutine, herein entitled "call_clock", that recognizes the presence of the information, in this case a single count, and the program then initiates program step 186. At step 186, the counter buffer, whose digital storage is 16 bit, converts the stored digital information to liquid crystal display format, and the microcontroller moves the signal to the liquid crystal display buffer (not shown). Control is then passed to step 188, in which the microcontroller 114 (see FIG. 17) queries the liquid crystal display to determine the state the liquid crystal backplane is in, which can be either high or low. If it is high, the liquid crystal display is ready to display information to the user and control passes to step 190. If not, the program passes control to step 192. If step 190 is selected by the program, the module 140 returns control to the main program (FIG. 18), as indicated at step 194 in FIG. 22.

Returning to step 176 in FIG. 22, if the "tick_count" is not equal to zero, a condition that can be present for several different reasons, such as when the handset is replaced in its cradle less than one second after it the counter starts. If this condition pertains, where the count is not equal to zero, program control passes to step 196, at which the microcontroller queries the liquid crystal display buffer to determine whether the buffer is full. If the buffer is full, control returns to main module flow path to step 188 and the program continues as described above. If the buffer is not full, the program passes control to step 192 and thence to main program module flow path.

The interrupt module 140, at step 180, determines whether the user is dialing an outgoing call. If not, control remains along the main module control path. If an outgoing call is sensed, as described above, program control branches to step 184, as described above. Program control then passes to step 196, and follows the steps described above to determine when and under what conditions program control returns to the main module flow path.

FIG. 22 contains a description of that portion of program module 146 (see FIG. 18) that relates to the steps employed to impose a delay on the timing apparatus of the instant invention when the user is dialing out. As shown at step 142 in FIG. 18, if no ringing is detected after the telephone is activated either by lifting it from its cradle or turning on an external speaker, program control passes to step or module 146. In initial step 198, the memory bank that retains information about the previous call is queried. If such information exists, it is read, converted to liquid crystal display format, and placed in the liquid crystal display buffer to be seen by the user. This step may be dispensed with, if desired. In either case, program control passes to step 200. The program remains idle and awaits the detection of the 80 Hz interrupt. When the interrupt is sensed by the microcontroller, program control passes to step 202. If the user presses the select key, as described earlier in the body of this application, program control passes to step 152 in FIG. 18 and continues in accordance with the further steps following step 152 outlined in FIG. 18.

Figure 23:
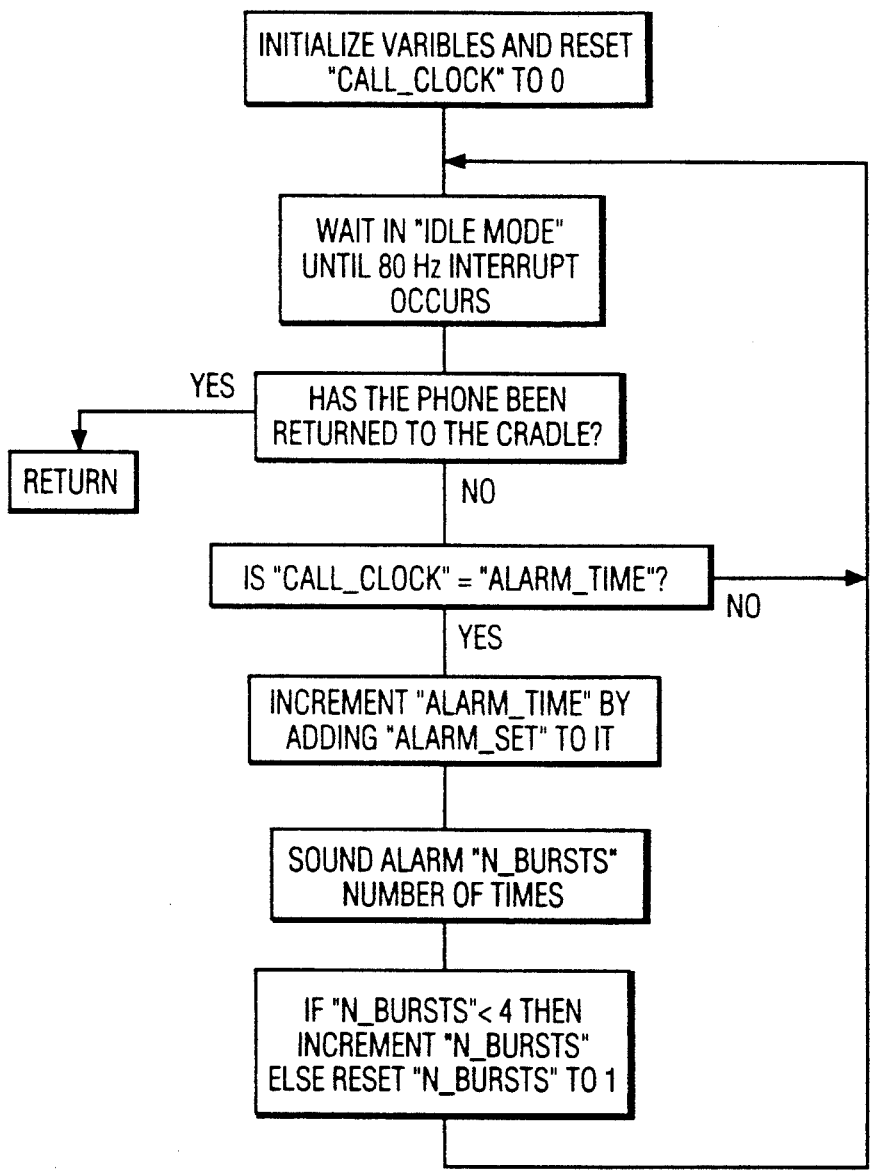
Figure 24:
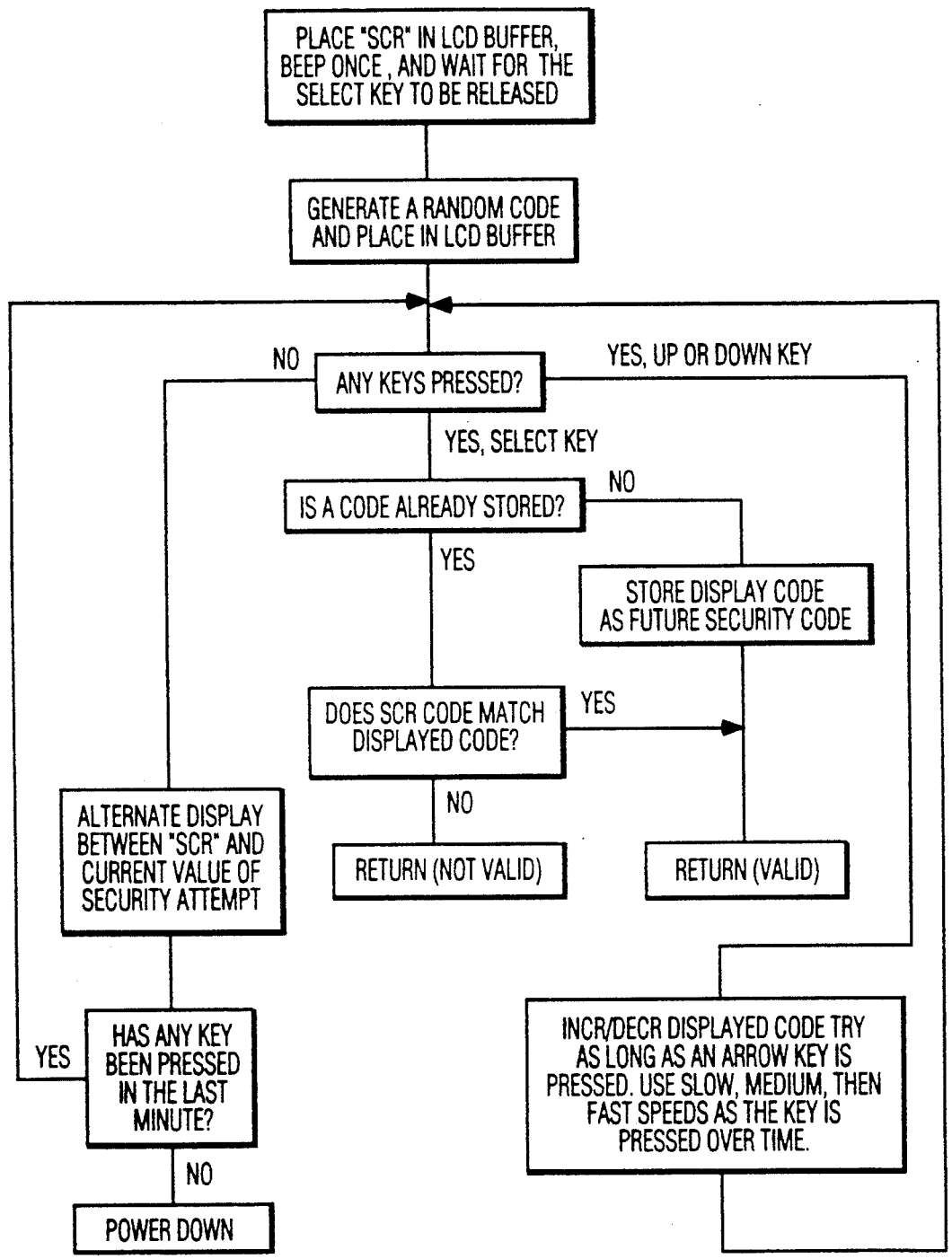
Figure 25:
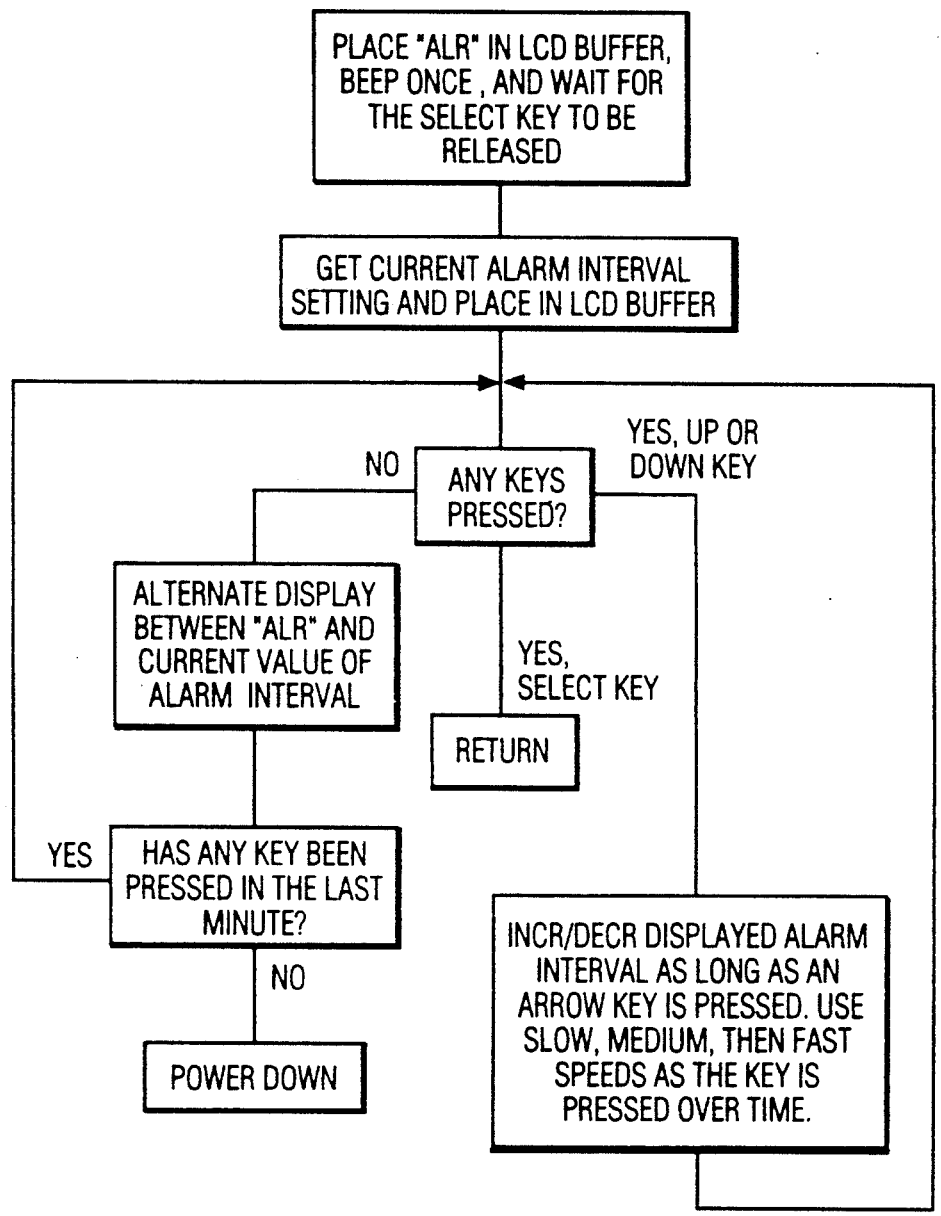
Figure 26:
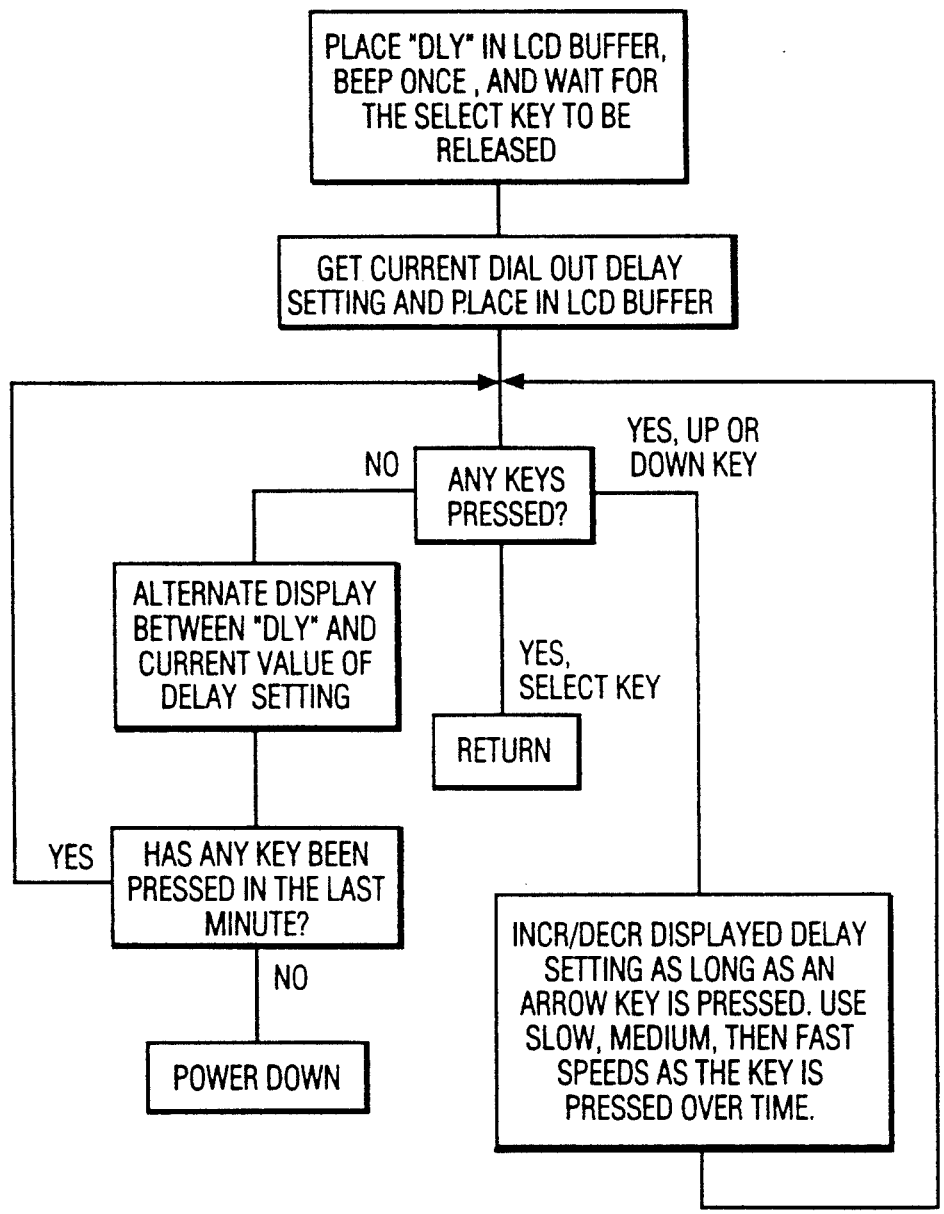
Figure 27:
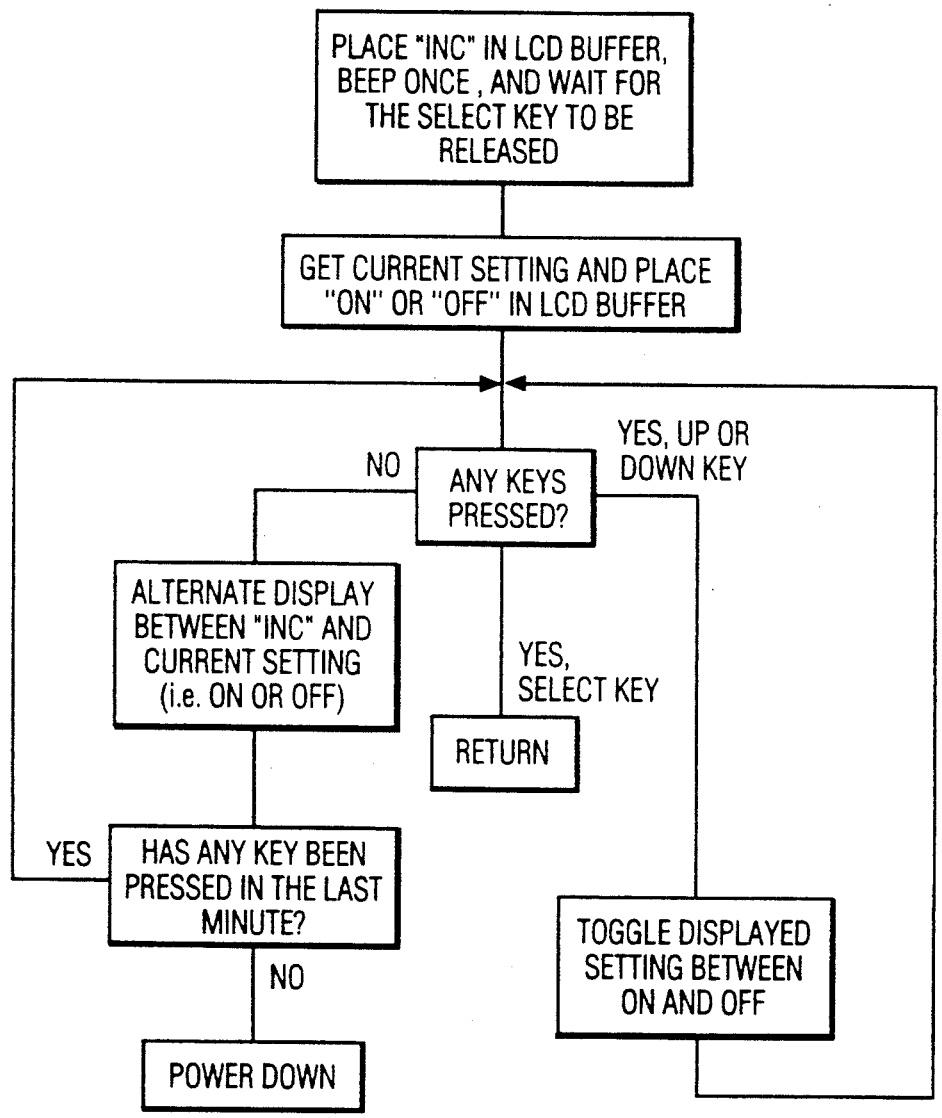

Returning to the flow chart of FIG. 23, if the select key was not depressed by the user, program control passes to step 206, which senses whether the telephone has been returned to its cradle (or the speaker turned off to terminate the call). If the telephone has been returned to its cradle, or the speaker turned off to terminate the call, program control passes to step 208, at which the microcontroller senses whether the timer has been deactivated, and if so, the microcontroller then powers down and awaits the next activation. If not, program control passes to step 210, which queries the block of code identified as "delay_clock" to sense whether the information stored therein equals the desired delay. If it does, program control returns to FIG. 18 at step 158. If not, the program loops and returns to step 200 in FIG. 22 in an endless loop that can be broken only by setting the appropriate delay or by hanging up the phone to cause the program to branch at step 206 to power down the microcontroller.

FIGS. 18 through 27 are also included and form a part of this application sufficient to demonstrate the operation of the program modules shown in FIGS. 17 and 18.

It is intended to cover all modifications in and to the described invention that fall within the spirit and scope of the claims appended hereto.

What I claim is:

1. A telephone timing apparatus for use in timing the length of telephone calls comprising means for connecting the said apparatus to a telephone and to the incoming telephone line for the said telephone; circuit means for timing the length of a telephone call, said circuit means comprising one or more batteries to provide power to the circuit to operate the timer when the telephone is in use, and means for drawing power from the incoming telephone line when the telephone is not in use to keep said circuit means ready to sense a telephone call and to respond thereto.

2. The telephone timing apparatus according to claim 1 further comprising means for converting the current available on the incoming telephone wire to charge the said batteries, thus extending the life of the telephone sensing apparatus.

* * * * *